United States Patent [19]

Spisak

[11] 4,063,783

[45] Dec. 20, 1977

[54] RETAINER FOR WHEEL TRIM

[76] Inventor: Edward G. Spisak, 35700 Oakwood Lane, Westland, Mich. 48185

[21] Appl. No.: 770,815

[22] Filed: Feb. 22, 1977

[51] Int. Cl.² .............................................. B60B 7/06
[52] U.S. Cl. .................................. 301/37 P; 301/37 R
[58] Field of Search ................ 301/37 R, 37 P, 37 T, 301/37 PB, 37 B, 37 ST, 37 TC, 37 C, 37 CD, 108 R, 108 A; 24/73 B, 73 HC

[56] References Cited

U.S. PATENT DOCUMENTS

| 3,746,397 | 7/1973 | Buerger | 301/37 R |
| 3,973,801 | 8/1976 | Beish et al. | 301/37 R X |

FOREIGN PATENT DOCUMENTS 2,249,539  4/1974  Germany ......................... 301/108 R Primary Examiner—Allen N. Knowles
Assistant Examiner—Charles A. Marmor
Attorney, Agent, or Firm—Fisher, Gerhardt & Groh

[57] ABSTRACT

A wheel trim assembly having a plastic trim portion with a plurality of metal retaining members attached to the plastic portion for securely attaching the assembly to a vehicle wheel flange. The metal retaining members including circumferentially spaced hooks for engaging opposite edges of the plastic portion and spring clips for engaging in recesses in the plastic portion to secure the retaining members to the wheel trim.

9 Claims, 4 Drawing Figures

RETAINER FOR WHEEL TRIM

This invention relates to decorative trim assemblies for automotive vehicle wheels and more particularly to an improved retaining arrangement especially adapted for retaining plastic trim members on the wheels of the vehicles.

Vehicle trim in the form of a wheel cover to cover the entire wheel or a decorative ring for the outer circumferential portion of the wheel are difficult to maintain in position on the wheel because the wheel itself is subject to complex loading and stresses tending to temporarily deform the wheel as a result of braking, vehicle loading, turning of the vehicle on curves and vibrations and shocks from the road surface. The wheel trim assembly when mounted on a wheel is subject to all such stresses and deflections and in addition to the centrifugal loading and inertia causing relative movement both circumferentially and axially of the wheel. Such problems are compounded when the wheel trim member is made of plastic because of the difficulty of forming retaining members to grip the vehicle wheel. Typically, resilient metal retainers are mounted on a separate metal retaining ring which is attached to or embedded in the plastic trim member. The attachment of separate retainers at circumferentially spaced portions on the trim member requires embedding in the plastic during the molding operation or, if attached after molding, the wheel trim member must have a complex shape to receive the metal retainers which in turn requires complex and expensive dies and molding techniques.

It is an object of the invention to provide a wheel trim and particularly an improved retainer arrangement for plastic wheel trim in which the retainers are easily attached to the plastic member without requiring tools or additional fastening means.

Still another object of the invention is to provide a trim arrangement having retainers attached to the trim assembly to prevent displacement radially, axially and circumferentially without imposing excessive loads on the portions of the plastic wheel cover which hold the retainers in position.

The wheel trim assembly includes a decorative portion in the form of a cover or a ring which may be made of plastic and has annularly spaced attaching brackets molded or formed integrally with the decorative portion. The attaching brackets receive metal retaining devices each of which is provided with a spring like element permitting attachment of the retaining device to the trim member without the use of tools. The spring element prevents removal of the retaining device which is maintained on the bracket for engagement with the tire flange of a wheel to hold the wheel trim assembly in position.

Figure 3:
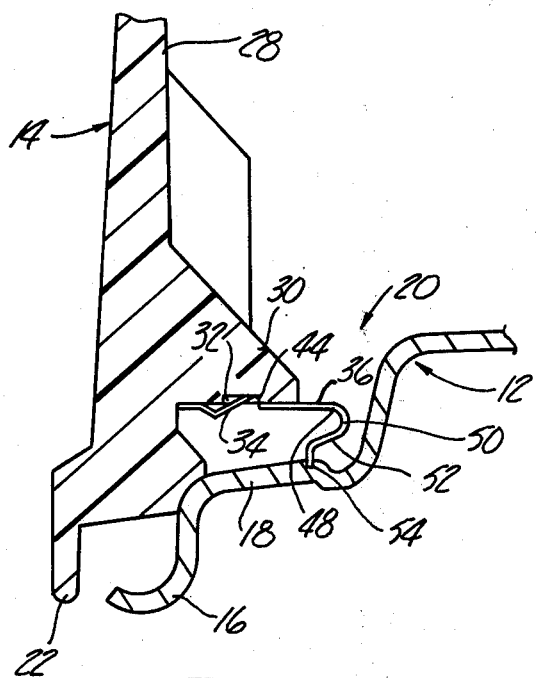
FIG. 3 is a sectional view on line 3—3 in FIG. 2 showing the relationship of the wheel trim assembly relative to the tire rim of a vehicle wheel.

The wheel trim assembly including the improved retaining arrangement embodying the invention is generally designated at 10 and is adapted for connection to the wheel of a vehicle a portion of which is shown at 12 in FIG. 3.

The wheel trim assembly 10 may be in the form of a ring or as seen in the drawings, a full wheel cover 14 made of rigid plastic material and may have various ornamental configurations. The wheel cover 14 is attached to the vehicle wheel 12 which as seen in FIG. 3 has a radial outer lip 16 and an axially extending annular flange 18. The flange 18 is bitingly engaged by metal retainer assemblies 20 mounted on the wheel trim 14 and serving to hold the wheel trim in position on the wheel. The plastic wheel cover has a radial outer lip 22 generally coextensive with the tire rim lip 16 to substantially conceal the latter as well as the metal retainers when the wheel cover 14 is mounted on the wheel 12.

The retaining devices 20 are each made of a single piece of material, preferably hardened, spring-like steel. The retaining devices 20 are connected to the back or rear face of the wheel cover and preferably a minimum of three retaining devices are employed although as shown in the drawings an even number of retaining devices are disposed with pairs in diametrically opposed relationship to each other. The metal retainers 20 are disposed on a circle of the wheel cover 14 generally coextensive with the tire rim flange 18.

The retainers 20 are supported on bracket portions 24 formed of plastic and molded integrally with the plastic wheel cover 14. The bracket portions 24 each include a platform 26 which projects axially from the rear face 28 of the wheel cover 14 and extends generally tangentially to an imaginary circle spaced radially inwardly slightly from the outer lip 22 of the wheel trim 14. A supporting web 30 extends from a radial underside of the platform 26 and serves to reenforce the bracket portion 24 particularly against loads imposed radially inwardly towards the axis of rotation. The radial outer surface of the platform 26 is provided with a recess 32 to receive a spring clip 34 forming part of the retainer 20.

The retainer assembly 20 is made of a single piece of metal and includes a flat base portion 36 adapted to rest on the platform portion 26 of the bracket member 24. The base portion 36 has a pair of spaced hook portions 38 at opposite edges of the base member 36 which engage the circumferentially spaced edges 40 of the bracket member 24 to prevent relative circumferential movement between the retainer 20 and the bracket member 24.

Figure 4:
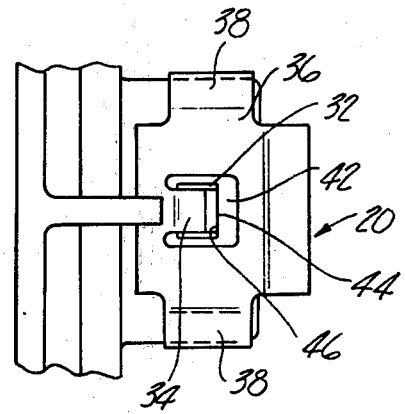
FIG. 4 is a bottom view of the portion of the wheel trim portion seen in FIG. 3.

The base portion 36 of the retainer assembly 20 includes the spring clip 34 which is formed as seen in FIG. 4 by cutting out a generally U-shaped portion 42 from the base member. The spring clip 34 is bent to be positioned radially inwardly of the base member and to be disposed within the recess 32 with the edge 44 in engagement with a wall 46.

As seen in FIG. 3, the base portion 36 of the retainer 20 merges with one leg 48 of the U-shaped member 50, the other leg 52 of the U-shaped portion 50 merges with an outer blade portion 54 which is disposed generally perpendicular to the base portion when the retaining device is detached from the wheel.

Figure 1:
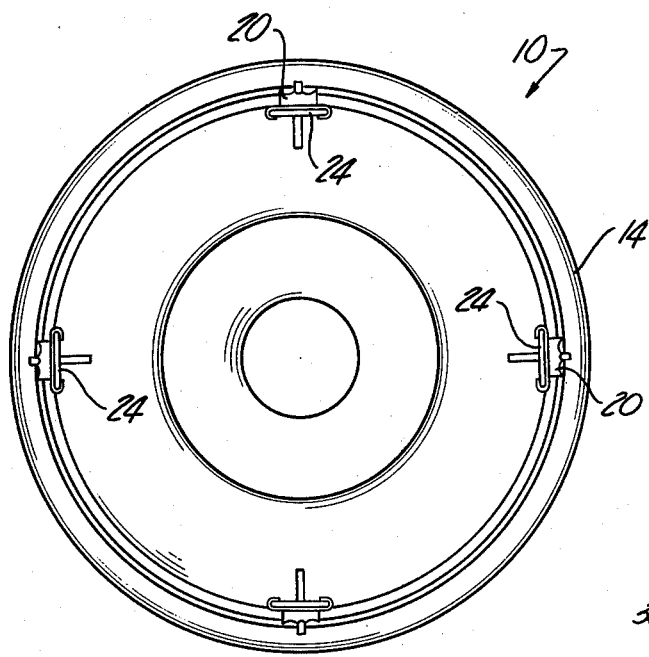
FIG. 1 is a rear plan view of a wheel trim assembly embodying the invention.
Figure 2:
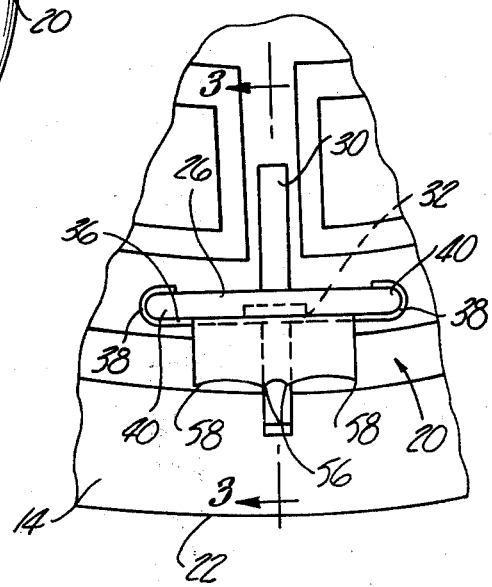
FIG. 2 is a view of a portion of the wheel trim assembly seen in FIG. 1.

As best seen in FIG. 2, the blade portion 54 is provided with a pair of intermediate teeth 56 and a pair of outboard teeth 58, the points of which are on an arc conforming generally to the curvature of the inner circumferential surface of the wheel flange 18.

Typically, the wheel cover 14 is molded and thereafter, if desired, may be plated to be given an ornamental and metallic appearance after which the retainer members 20 may be attached to the wheel cover 14. This is accomplished by aligning the hooks 38 with the spaced edges 40 of the platform 26 of the bracket members 24. Thereafter, the retainers 20 are pushed axially against the back-face 28 of the wheel cover 14 during which time the edge 44 of the spring clip 34 is deflected radially outwardly by the radial outward surface of the platform 26 until the edge 44 drops into the recess 32. At this time the edge 44 engages the wall 46 of the recess and prevents axial displacement and removal of the retainer 20 except with the use of tools. The hook portions 38 in engagement with the edges 40 of the platform 26 serve to prevent relative circumferential and radial displacement between the retainer 20 and the bracket member 24. Attachment is readily accomplished in this manner without the use of tools or additional fasteners.

When the retainers 20 have all been located on the wheel cover 14, attachment of the cover to the wheel 12 of the vehicle is accomplished by pushing the wheel cover generally axially of the wheel. During this time the blade portions 54 of the retaining members 20 engage the wheel flange 18. Inward movement of the wheel trim assembly 10 will increasingly deflect the blade portion 54 and the U-shaped portion 50 so that in the final attached position the blade portion 54 is disposed at an angle to the wheel flange 18 and the U-shaped portion 50 is slightly deflected. Such deflection is facilitated by projection of the base portion 36 forming the leg 48 beyond the end of the platform.

From an examination of the drawings and particularly FIGS. 2 and 3, it will be observed that the retainers 20 are well supported by the bracket members 24 to absorb radial loads transmitted through the retaining devices 20 to the trim member 14. Moreover, the bracket member 24 is of simple configuration which facilitates easy molding and avoids intricately shaped portions which might fracture upon imposing loads of the type encountered with wheel trim.

A wheel trim assembly has been provided in which retaining devices are mounted on a plastic, decorative trim member such as a wheel cover or ring. The retaining devices are supported in circumferentially spaced apart relationship near the periphery of the wheel trim member by way of an arrangement including plastic bracket members formed integrally with the plastic wheel trim member so that the metallic retaining devices engage the edges of the bracket members to prevent relative circumferential and radial movement. The metallic retainers each include a spring detent device which permits assembly of the retaining device with the trim member but prevents its separation from the wheel trim member. The attachment of the retaining devices is such that molding of the wheel cover can take place and the wheel cover may be plated if desired, prior to attachment of the retaining devices.

The embodiments of the invention in which an exclusive property or privilege is claimed are defined as follows:

1. A wheel trim member having a bracket member extending axially from a back surface of said wheel trim member, a retainer mounted on a radial outer surface of said bracket member and including a base portion, said base portion including attaching portions at circumferentially spaced points engaging opposite edge portions of said bracket member to prevent relative circumferential and radial movement of said retainer relative to said bracket member, said bracket member having a radially outwardly opening recess, a projecting element forming part of said retainer and disposed in said recess and preventing axial movement of said retainer relative to said bracket member, and means forming part of said base of said retainer to grip the tire rim of a wheel.

2. The combination of claim 1 wherein said attaching portions are in the form of hooks engaging circumferentially spaced edges of said bracket member and radially opposed surfaces thereof.

3. The combination of claim 1 wherein said projecting element is deflectable radially outwardly upon movement of said retainer towards said wheel trim member during attachment of said retainer on said wheel trim member.

4. The combination of claim 1 wherein the means forming part of said base member includes radially extending grip elements resiliently movable relative to said base.

5. The combination of claim 1 wherein the base portion projects axially beyond an edge of said bracket member and presents a portion deflectable radially relative to said bracket member.

6. The combination of claim 1 wherein said projecting element is radially deflectable relative to said base member to permit relative axial movement of said retainer and bracket member in one direction during mounting of said retainer on said bracket member and prevents axial movement in the other direction to prevent removal of said retainer from said bracket member.

7. The combination of claim 1 wherein said bracket member includes a platform portion spaced radially inwardly in closely spaced relationship to the outer periphery of said wheel trim member and extending generally tangentially of said tire rim of said vehicle.

8. The combination of claim 7 in which said retainer is supported on a radially facing outer portion of said platform portion.

9. The combination of claim 7 and further comprising a brace member extending radially inwardly from said platform portion to support the latter relative to said wheel trim member.

* * * * *